(12) United States Patent
Appelo

(10) Patent No.: US 8,888,881 B2
(45) Date of Patent: Nov. 18, 2014

(54) FILTER BAG CAGE JOINT

(75) Inventor: Per-Erik Appelo, Knoxville, TN (US)

(73) Assignee: ALSTOM Technology Ltd, Baden (CH)

( * ) Notice: Subject to any disclaimer, the term of this patent is extended or adjusted under 35 U.S.C. 154(b) by 275 days.

(21) Appl. No.: 13/409,687

(22) Filed: Mar. 1, 2012

(65) Prior Publication Data
US 2013/0227921 A1    Sep. 5, 2013

(51) Int. Cl.
B01D 59/00    (2006.01)

(52) U.S. Cl.
USPC ............ 55/378; 55/341.1; 55/372; 55/360; 55/374; 55/379

(58) Field of Classification Search
CPC ........ B01D 46/02; B01D 46/04; B01D 46/06; B01D 46/023
USPC ........ 55/341.1, 372, 360, 364, 374, 378–379; 95/59, 63, 70; 96/55
See application file for complete search history.

(56) References Cited

U.S. PATENT DOCUMENTS

| | | |
|---|---|---|
| 3,747,307 A | 7/1973 | Peshina et al. |
| 4,073,632 A | 2/1978 | Reinauer et al. |
| 4,194,894 A | 3/1980 | Noland |
| 4,257,790 A | 3/1981 | Bergquist et al. |
| 4,336,035 A | 6/1982 | Evenstad et al. |
| 4,435,197 A | 3/1984 | Nijhawan et al. |
| 4,738,696 A | 4/1988 | Staffeld |
| 5,173,098 A | 12/1992 | Pipkorn |
| 5,308,369 A | 5/1994 | Morton et al. |
| 5,308,485 A | 5/1994 | Griffin et al. |
| 5,636,422 A | 6/1997 | Pyron et al. |
| 5,951,726 A | 9/1999 | Allingham et al. |
| 6,626,970 B2 | 9/2003 | Pipkorn et al. |
| 6,676,722 B1 | 1/2004 | Clements et al. |
| 6,790,250 B2 | 9/2004 | Pipkorn et al. |
| 6,858,052 B2 | 2/2005 | Clements |
| 6,905,529 B2 | 6/2005 | Pipkorn et al. |
| 7,371,267 B2 | 5/2008 | Pipkorn et al. |
| 7,905,935 B2 | 3/2011 | Clements |
| 7,927,392 B2 * | 4/2011 | Clements et al. ............ 55/341.1 |
| 2003/0177744 A1 | 9/2003 | Gerakios et al. |
| 2004/0134170 A1 | 7/2004 | Pipkorn et al. |
| 2006/0032197 A1 | 2/2006 | Pyron |
| 2007/0119130 A1 | 5/2007 | Fliszar |
| 2008/0120949 A1 | 5/2008 | Welch et al. |
| 2010/0223895 A1 | 9/2010 | Peshina |
| 2011/0067570 A1 | 3/2011 | Lambert et al. |

FOREIGN PATENT DOCUMENTS

| | | |
|---|---|---|
| WO | 2009042161 A1 | 4/2009 |
| WO | 2011109908 A1 | 9/2011 |

* cited by examiner

Primary Examiner — Jason M Greene
Assistant Examiner — Karla Hawkins

(57) ABSTRACT

A filter support cage for a baghouse filter comprises a first filter cage segment comprising elongated body portion having a top end and a bottom end, a second filter cage segment comprising a second elongated body portion having a top end and a bottom end, and a coupling member positioned between and connecting the bottom end of the first filter cage segment and the top end of the second filter cage segment.

14 Claims, 6 Drawing Sheets

FILTER BAG CAGE JOINT

TECHNICAL FIELD

The present disclosure relates generally to filter bag cages and, more particularly, to filter bag cages connected together with flexible joints.

BACKGROUND

Industrial processes, such as processes that involve the grinding or combustion of materials such as coal, typically generate particulate matter that is carried by a process gas. In order to reduce emissions of particulate matter to the atmosphere, the process gas is often filtered in a gas cleaning plant before being discharged into the atmosphere. One manner of filtering the process gas involves directing the gas through a baghouse filter system. A baghouse filter system generally employs fabric filters in the form of tubular filter bags, each of which is retained in its tubular shape by a filter cage.

Baghouse filter cages may be several meters long. Because of their size, maintaining and storing them may be difficult and costly. To facilitate maintenance and storage, such baghouse filter cages may be modular to allow for assembly and disassembly. Modular baghouse filter cages, however, generally rely on the use of clips or other fastening devices that hold the baghouse filter cages together in rigid assemblies. In doing so, trained technicians often utilize various tools to ensure that the baghouse filter cages are suitably assembled and operable for their intended filtering processes.

SUMMARY

According to aspects illustrated herein, there is provided a filter support cage for a baghouse filter. The filter support cage comprises a first filter cage segment comprising a hollow mesh cylinder having an open top end and an open bottom end, a second filter cage segment comprising a second hollow mesh cylinder having an open top end and an open bottom end, and a coupling ring positioned between and connecting the bottom end of the first filter cage segment and the top end of the second filter cage segment.

According to other aspects illustrated herein, there is provided a filter cage segment for a filter cage in a baghouse. The filter cage segment comprises a hollow mesh cylinder having an open top end, an open bottom end, and an axis extending longitudinally through the hollow mesh cylinder. A coupling ring is flexibly coupled to either the top end or the bottom end of the hollow mesh cylinder. The hollow mesh cylinder comprises a first support member defined by a band or ring positioned at the top end, a second support member defined by a band or ring positioned at the bottom end, and a plurality of longitudinal bars connecting the first support member and the second support member. A locking longitudinal bar is flexibly connected to either the first support member or the second support member, and a retaining longitudinal bar is rigidly connected to the first support member and the second support member and is positioned substantially diametrically opposite the locking longitudinal bar. The coupling band or ring is flexibly coupled to the top end or the bottom end via the locking longitudinal bar and the retaining longitudinal bar.

According to other aspects illustrated herein, there is provided a filter cage support for a filter in a baghouse. The filter cage support comprises a hollow mesh cylinder having an open top end, an open bottom end, and an axis extending longitudinally through the hollow mesh cylinder. A coupling band or ring is coupled to the bottom end of the hollow mesh cylinder. The hollow mesh cylinder comprises a first support member defined by a band or ring positioned at the top end and a second support member defined by a band or ring positioned at the bottom end. The center of the band or ring at the top end is coincident with the axis, as is the center of the band or ring at the bottom end. The band or ring of the second support member has a gap defined therein. A third support member defined by another band or ring is positioned between the first support member and the second support member such that a center of that band or ring is also coincident with the axis. A plurality of longitudinal bars connect the first support member, the second support member, and the third support member. A locking longitudinal bar has a first end flexibly connected to the first support member and also has a second end positioned proximate the gap, the second end defining a first hook. A sliding locking plate is positioned on the locking longitudinal bar and on at least one of the longitudinal bars adjacent to the locking longitudinal bar. A retaining longitudinal bar is rigidly connected to the first support member and the second support member and is positioned substantially diametrically opposite the locking longitudinal bar, the retaining longitudinal bar defining a second hook proximate the bottom end of the hollow mesh cylinder. The coupling band or ring has a plurality of openings therein and is coupled to the bottom end of the hollow mesh cylinder via the first hook of the locking longitudinal bar and the second hook of the retaining longitudinal bar received in respective openings in the coupling band or ring.

The above-described features as well as other features are exemplified by the following Figures and detailed description.

DETAILED DESCRIPTION

Figure 1:
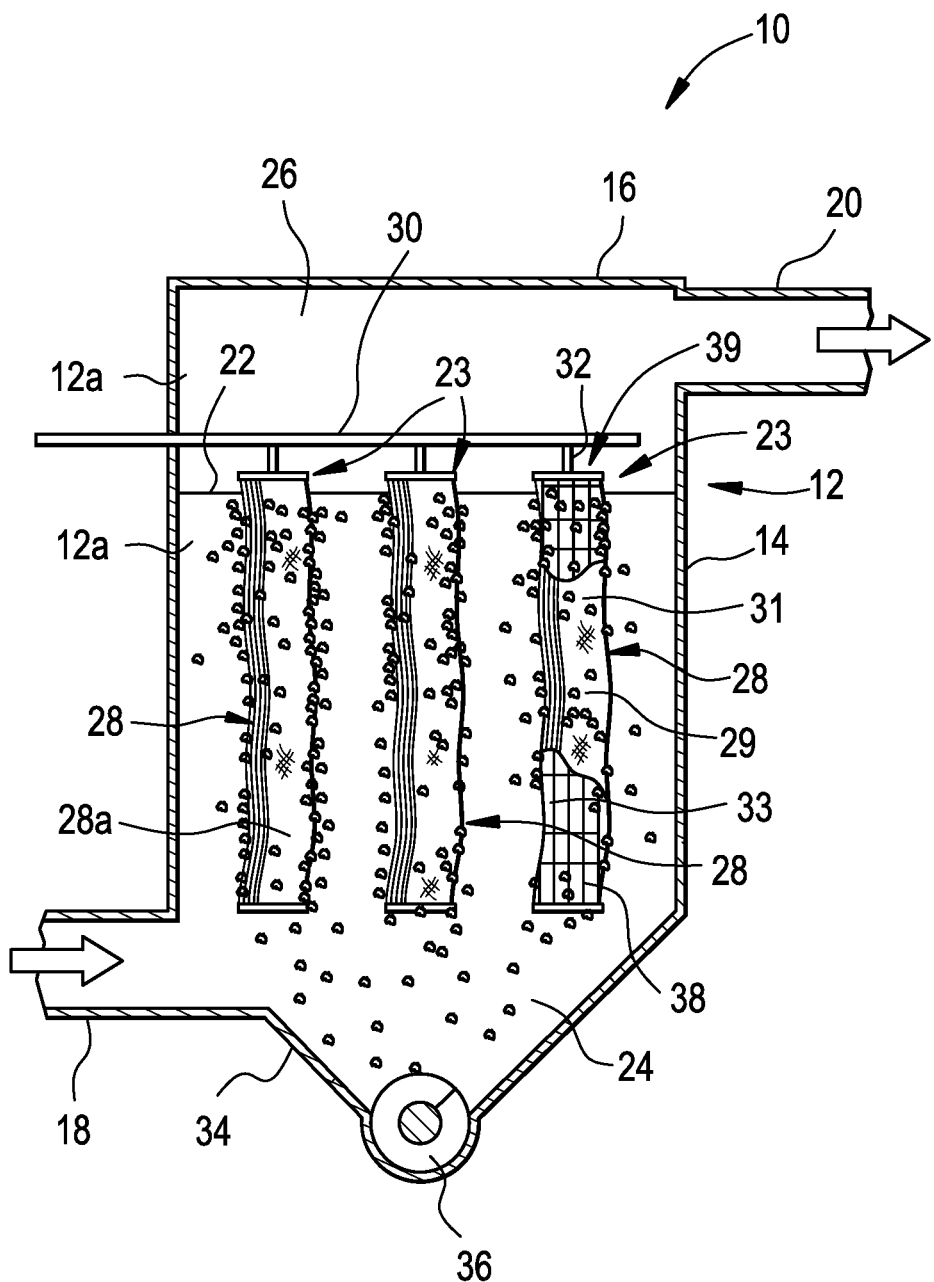
FIG. 1 is a schematic cross-sectional view of a baghouse filter.

As shown in FIG. 1, a baghouse filter is designated generally by the reference number 10 and is hereinafter referred to as "filter 10." The filter 10 comprises a housing 12 divided into a lower housing portion 14 and an upper housing portion 16. The lower housing portion 14 is provided with a raw gas inlet 18 for receiving raw, particle-laden gas generated by an industrial process. As used herein, the term "raw gas" is defined as particle-laden gas, originating from an industrial process, to be cleaned in a gas cleaning device. The raw gas entering filter 10 via the raw gas inlet 18 may be flue gas from a boiler located upstream with respect to a flow direction of raw gas, of the filter 10. The raw gas entering the filter 10 may be uncleaned, or as an alternative, may already have been subjected to some initial cleaning in any gas cleaning equipment located upstream thereof, such as, but not limited to, an electrostatic precipitator. The upper housing portion 16 is provided with a cleaned gas outlet 20 for channeling gas cleaned by the filter 10 to equipment located downstream of the filter 10. Such equipment located downstream of the filter 10 may be equipment for subsequent, additional cleaning of the gas, or a smoke stack for discharging the cleaned gas into the atmosphere.

A horizontal plate 22 is arranged in the housing 12 to divide the interior space 12a defined by the housing 12 into a raw gas inlet chamber 24, located below the horizontal plate 22, and a cleaned gas outlet chamber 26, located above the horizontal plate 22. The raw gas inlet chamber 24, defined by the lower housing portion 14 and the horizontal plate 22, is fluidly connected to the raw gas inlet 18. The cleaned gas outlet chamber 26 defined by the upper housing portion 16 and the horizontal plate 22 is fluidly connected to the cleaned gas outlet 20. A filter bag 28 is arranged in each of a plurality of openings 23 in the horizontal plate 22. Each filter bag 28, which may comprise a filter material such as fabric 29, extends through one opening 23 in the horizontal plate 22. In operation, raw gas enters the raw gas inlet chamber 24 via the raw gas inlet 18. The raw gas flows through the fabric 29 of bags 28 and into the interior 33 of the filter bags 28 while dust particles are collected on the outside 31 of the fabric 29 of filter bags 28 such that the raw gas, when flowing through the fabric 29 of the filter bags 28, is cleaned. The cleaned gas flows from the interior 33 of the filter bags 28, through the openings 23 of the horizontal plate 22, into the cleaned gas outlet chamber 26, and leaves the filter 10 via the cleaned gas outlet 20.

Collected dust particles can be removed from the filter bags 28. To do so, a pulsing gas duct 30 is arranged in the upper portion 16 of the filter 10. The pulsing gas duct 30 is provided with one pulsing nozzle 32 for each of the filter bags 28. When it has been determined that it is suitable to remove collected dust particles from the filter bags 28, a short pulse of gas is directed, via the pulsing gas duct 30 through fluidly connected pulsing nozzles 32, into the interior 33 of filter bags 28. As an effect of each pulse of gas, the filter bags 28 expand rapidly, causing dust collected on the exterior 28a thereof to be released from the filter bags 28. Such released dust falls down into a hopper 34 in the lower portion 14 of the housing 12. Occasionally, the dust is removed from the hopper 34 by any suitable mechanism, such as a screw 36.

Due to the gas flow resistance of the fabric 29 of the filter bags 28 upon dust accumulation thereon, the pressure of the gas drops as the raw gas flows from the raw gas inlet chamber 24 to the cleaned gas outlet chamber 26. In order to keep the filter bags 28 expanded in their substantially tubular shape while the flow of raw gas acts as a compressive force on the filter bags 28, each of the filter bags 28 is mounted on a baghouse filter cage 38 (hereinafter "filter cage 38") that supports the filter bag 28. Each filter cage 38 has an elongated, hollow, cylindrical shape formed from wire or a "grate-like" or "mesh-like" material and extends downwardly into the raw gas inlet chamber 24 from horizontal plate 22. Each filter cage 38 has an upper end 39 attached to one of the openings 23 of the horizontal plate 22.

Figure 2:
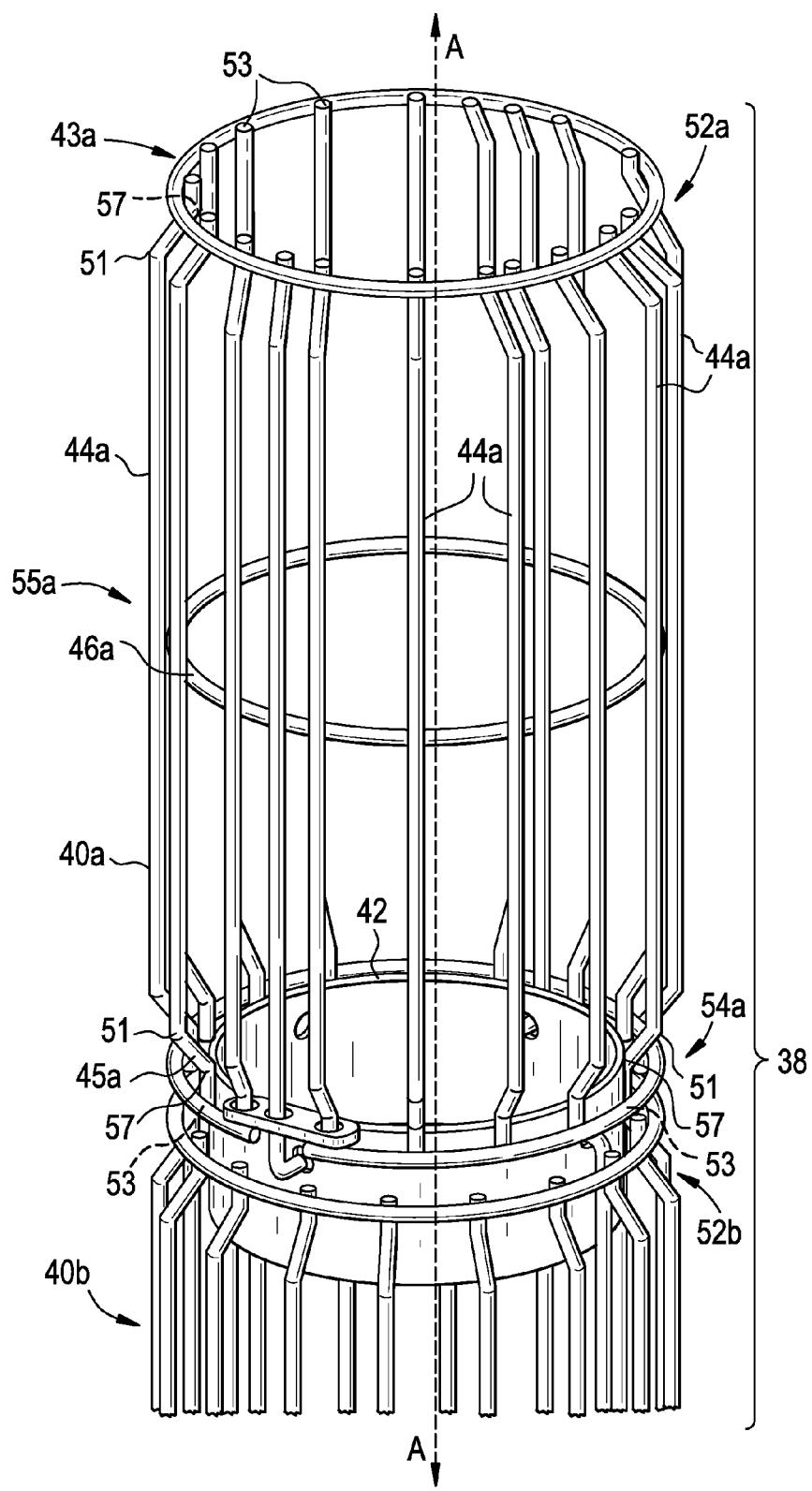
FIG. 2 is perspective view of a portion of a filter cage.

As shown in FIG. 2, the filter cage 38 comprises a plurality of separate filter cage segments 40, two of which are shown generally as 40a and 40b, removably connected via a coupling member or coupling band or ring 42. As used herein, the suffix "a" refers to an element related to the first filter cage segment 40a and the suffix "b" refers to an element related to the second filter cage segment 40b.

The first filter cage segment 40a has the general shape of an elongated tube or elongated body portion formed by a plurality of longitudinal bars 44a, a top support member 43a, a bottom support member 45a, and at least one intermediate support member 46a. Although only one intermediate support member 46a is shown, the present disclosure is not so limited, as any number of intermediate support members may be employed. Each of the longitudinal bars 44a comprises a metal wire or rod extending in a longitudinal direction parallel to a central longitudinal axis A. Each longitudinal bar 44a has a top end 52a and a bottom end 54a. The longitudinal bars 44a are rigidly connected to the top support member 43a at top end 52a, the bottom support member 45a at bottom end 54a, and the intermediate support members 46a at an intermediate position 55a to top end 52a and bottom end 54b, for example, by being welded thereto. As shown, each of the support members 43a, 45a, 46a is a circular or ring-shaped connector although other geometries can be acceptable, and transversely-oriented relative to the longitudinal bars with each of the support members 43a, 45a and 46a positioned in a plane perpendicular to that of axis A. Also as shown, the longitudinal bars 44a each include a first bend 51, which is an approximately 45 degree bend inwardly toward axis A proximate the ends 53 of longitudinal bars 44a. At a position approximately midway between first bend 51 and end 53, is second bend 57. Second bend 57 is a bend outwardly away from axis A so that top end 52a and bottom end 54a lie in a plane parallel to that of axis A. As such, each longitudinal bar 44a has an offset end portion 52a, 54a of the longitudinal bar 44a from that of intermediate portion 55a of the longitudinal bar 44a. The rigid connection of the longitudinal bars 44a to the support members 43a, 45a, 46a allows the filter cage 38 to be self-supporting and allows the filter bag 28 inserted over the filter cage 38 to retain its shape. The second filter cage segment 40b is substantially similar.

Each of the filter cage segments 40a, 40b define a top end 52a, 52b and a bottom end 54a, 54b. In an assembled filter cage 38, the top end 52b of the second filter cage segment 40b is positioned adjacent to the bottom end 54a of the first filter cage segment 40a. Any desirable number of filter cage segments 40a, 40b may be arranged in this fashion with the topmost filter cage segment 40a removably coupled to the horizontal plate 22 such that the filter bag 28 inserted over the filter cage 38 extends from the openings 23 in the horizontal plate 22.

Figure 3:
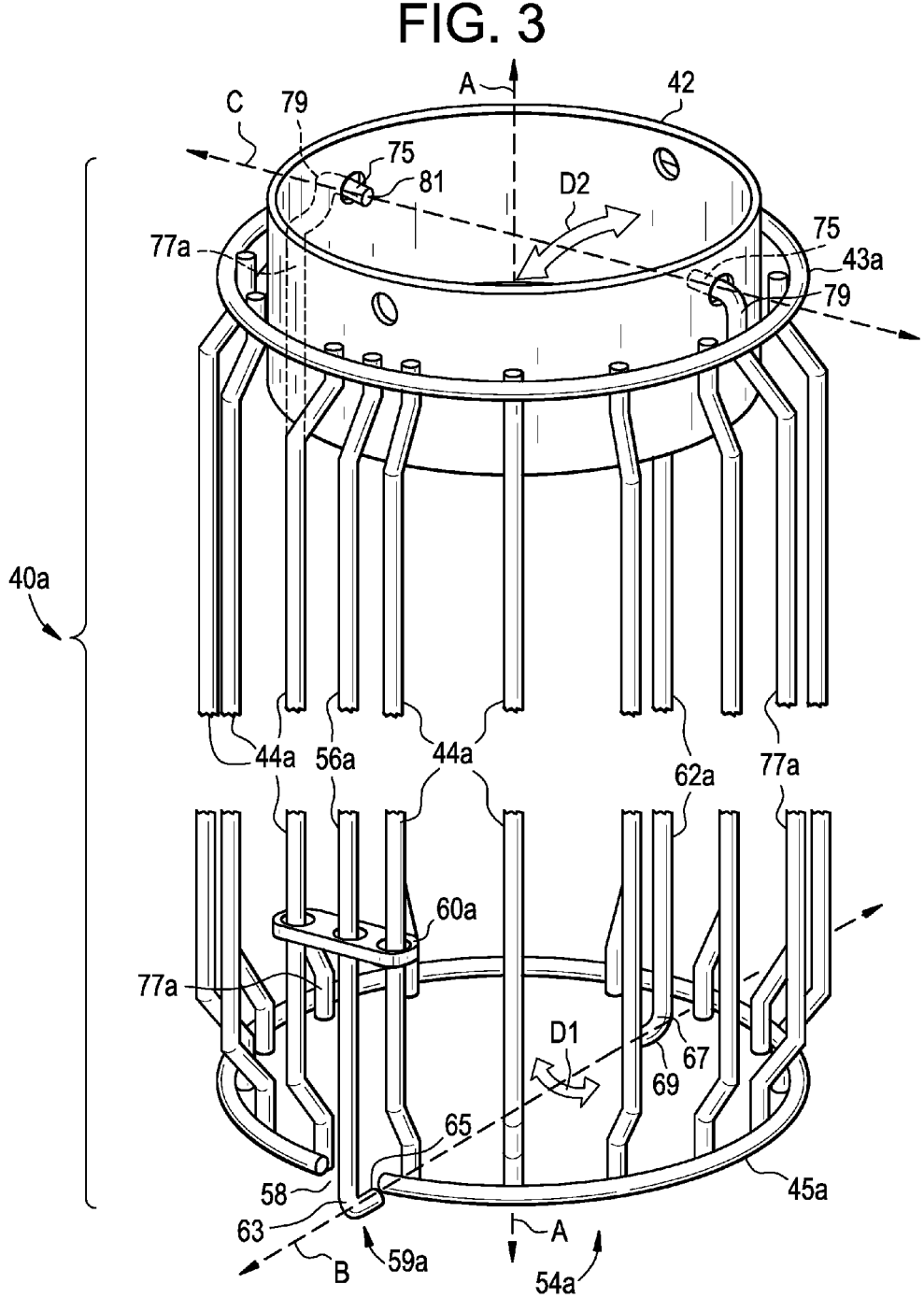
FIG. 3 is a perspective view of a filter cage segment with mid-section break-away.

As shown in FIG. 3, one of the longitudinal bars 44a of the first filter cage segment 40a defines a first locking longitudinal bar 56a that is rigidly connected (e.g., welded) to the top support member 43a and optionally welded to at least one of the intermediate support members 46a. The bottom end 59a of this first locking longitudinal bar 56a extends through a gap 58 in the bottom support member 45a at the bottom end 54a. A portion of the first locking longitudinal bar 56a proximate the unconnected end 61 (extending through the gap 58) is a bend 63 of about a ninety degree angle inwardly toward axis A to form a hook 65. Because the first locking longitudinal bar 56a is rigidly connected to the top support member 43a and not connected to the bottom support member 45a, the first locking longitudinal bar 56a can be flexed radially outward from the first filter cage segment 40a (i.e. away from the axis A). A locking mechanism 60a, as described below, is slidably disposed on the first locking longitudinal bar 56a and on the longitudinal bars 44a adjacent to the first locking longitudinal bar 56a.

A longitudinal bar 44a located on the first filter cage segment 40a diametrically opposite the first locking longitudinal bar 56a defines a retaining longitudinal bar 62a. This retaining longitudinal bar 62a is rigidly connected to the top support member 43a and to the bottom support member 45a and extends beyond the bottom support member 45a. Retaining longitudinal bar 62a proximate the bottom support member 45a includes a bend 67 of about a ninety degree angle inward toward axis A to form a hook 69. Because the first locking longitudinal bar 56a and the retaining longitudinal bar 62a are positioned diametrically opposite each other, an axis B extends across the diameter of the first filter cage segment 40a between hook 65 and hook 69. A filter cage segment 40b suspended from hook 65 and hook 69 can thereby swing back and forth by the hooks 65, 69 in directions transverse to the axis B.

Two second locking longitudinal bars 77a are each located substantially one fourth of the distance about the circumference of the first filter cage segment 40a from the first locking longitudinal bar 56a and diametrically opposite each other. The two second locking longitudinal bars 77a are each rigidly connected to the bottom support member 45a of the first filter cage segment 40a. The second locking longitudinal bars 77a extend above the top support member 43a, and each includes a bent portion 79 on the extended end 81 thereof defining a hook 75.

The hooks 75 of the second locking longitudinal bars 77a are each hooked to the coupling band or ring 42 by being positioned in holes in the coupling band or ring 42 or are otherwise pinned into the coupling band or ring 42 located concentrically in the opening defined by the top support member 43a. An axis C extends across the diameter of the coupling band or ring 42 through the hooks 75, thereby allowing the first filter cage segment 40a to swing back and forth by the hooks 75 in directions transverse to the axis C.

The second filter cage segment 40b is similarly configured with corresponding elements being designated by reference numbers with the suffix "b." Because axis B is transverse to axis C, an assembly of filter cage segments exhibits swinging motion in two directions, namely, a first direction D1 and a second direction D2 orthogonal to the first direction D1.

Figure 4:
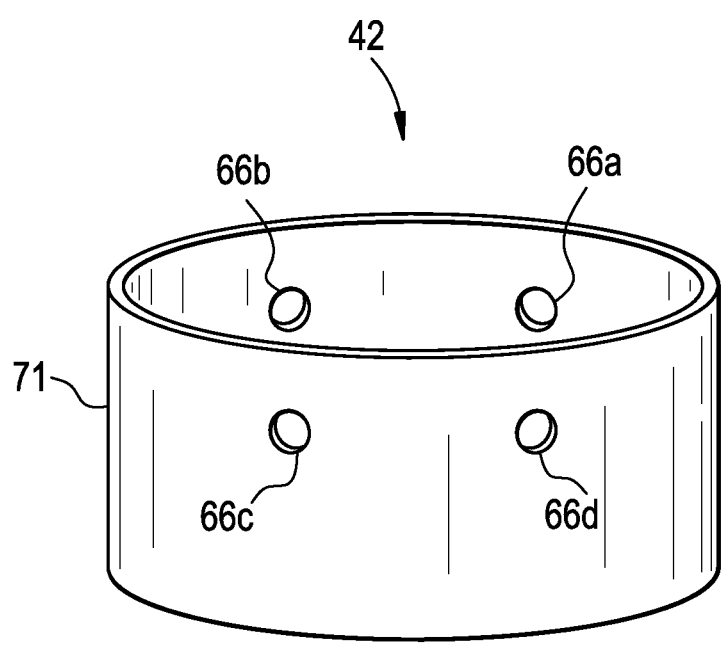
FIG. 4 is a perspective view of a coupling band or ring for coupling two filter cage segments together.

Referring now to FIG. 4, one embodiment of the coupling band or ring 42 is defined by a continuous band 71 configured to have a substantially hollow cylindrical shape. Four holes (66a, 66b, 66c, and 66d) are equidistantly located around the circumference of the continuous band 71 to accommodate the insertion of the hooks 65, 69 and the hooks 75. The diameter of the coupling band or ring 42 is less than the diameter of top support member 43a and the bottom support member 45a so as to allow the coupling band or ring to be positioned in the openings 81 defined by adjacently-positioned top and bottom support members 43, 45 and used to join the first filter cage segment 40a to the second filter cage segment 40b.

Figure 5A:
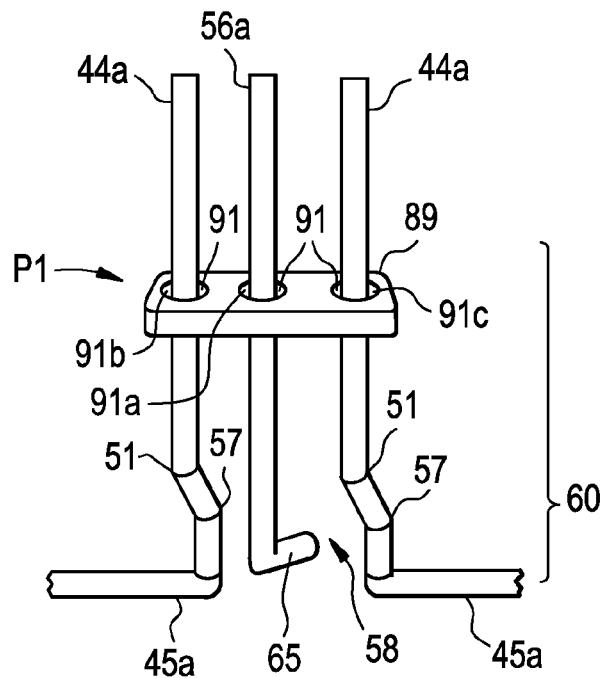
FIG. 5A is a perspective view of a locking mechanism of a filter cage segment in an unlocked position.
Figure 5B:
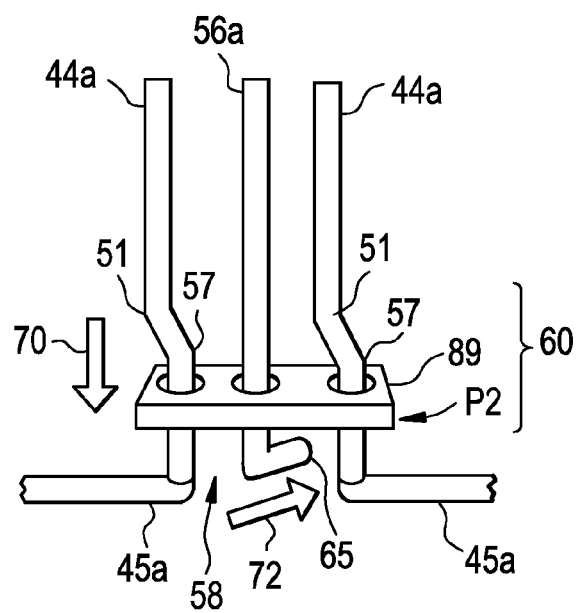
FIG. 5B is a perspective view of a locking mechanism of a filter cage segment in a locked position.

As shown in FIGS. 5A and 5B, the locking mechanism 60a comprises a plate 89 having three holes 91 extending therethrough such that the first locking longitudinal bar 56a is received through the center hole 91a and the two longitudinal bars 44a adjacent thereto are received through the side holes 91b, 91c. In an unlocked position P1, the hook 69 on the retaining longitudinal bar 62a is inserted into one of the holes 66 of the coupling band or ring 42. As shown in FIG. 5A, the plate 89 of the locking mechanism 60a is positioned above the first bend 51 and second bend 57, thereby allowing the first locking longitudinal bar 56a to be substantially parallel to the adjacent longitudinal bars 44a. In such a configuration, the hook 65 is distal from a coupling band or ring 42 positioned in the bottom support member 45a. In a locked position P2 as shown in FIG. 5B, the plate 89 of the locking mechanism 60a is pushed downwardly over first bend 51 and second bend 57 in the direction indicated by an arrow 70, thereby moving the bar radially inwardly toward axis A in the direction indicated by an arrow 72, which urges the hook 65 into one of the holes 66 in the coupling band or ring 42.

Figure 6:
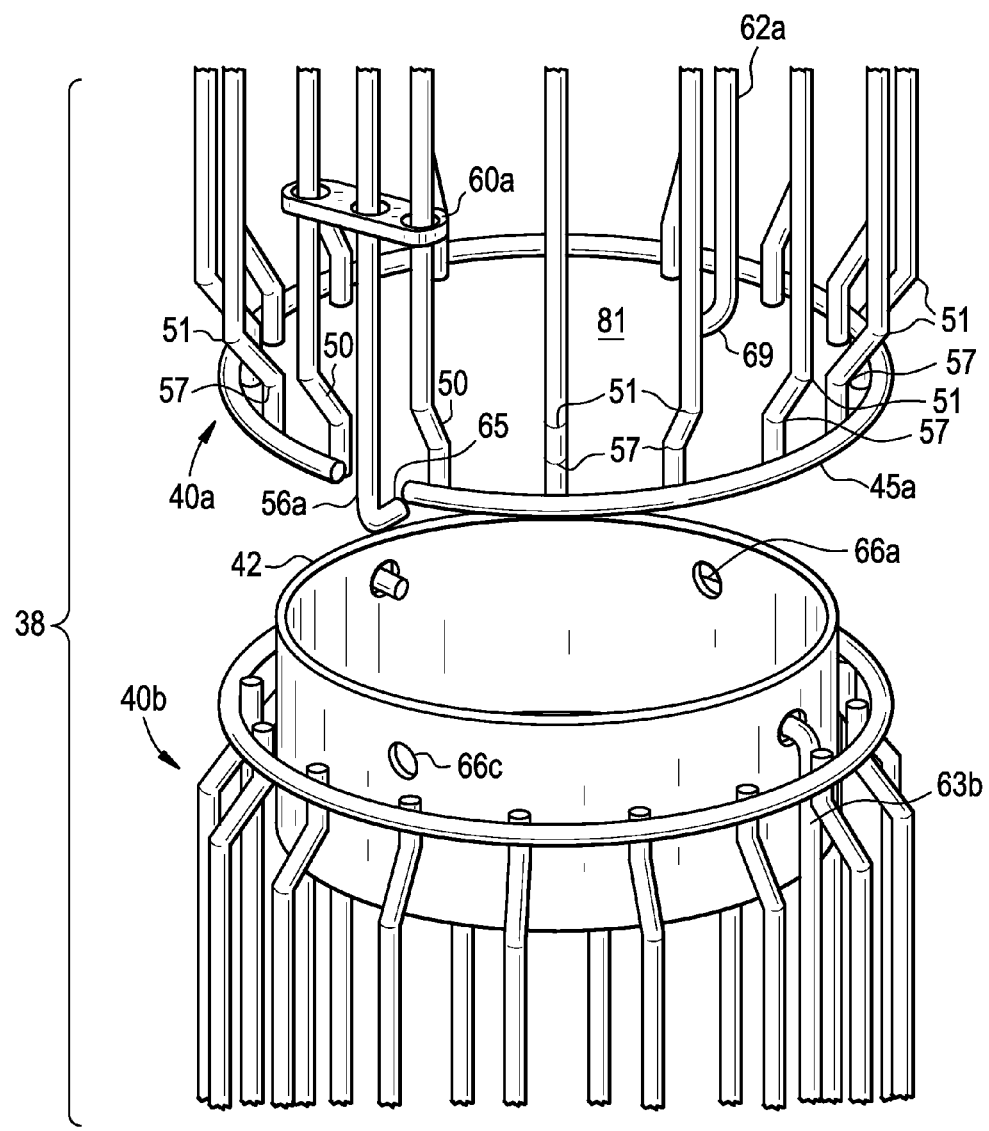
FIG. 6 is a perspective view of two filter cage segments being assembled.

As shown in FIG. 6, the filter cage 38 is assembled from two or more filter cage segments, namely, the first filter cage segment 40a and the second filter cage segment 40b. To assemble the filter cage 38, a first filter cage segment 40a is hooked or coupled to the coupling band or ring 42 previously hooked or pinned to a second filter cage segment 40b. To do so, the locking mechanism 60a is in a disengaged position (above first bend 51 and second bend 57), the coupling band or ring 42 of the second filter cage segment 40b is placed in the opening 81 defined by the bottom support member 45a on the first filter cage segment 40a, and the hook 69 on the retaining longitudinal bar 62a is inserted into the first hole 66a on the coupling band or ring 42. The hook 65 of the first locking longitudinal bar 56a is then aligned with the third hole 66c in the coupling band or ring 42, and the locking mechanism 60a is slid along the first locking longitudinal bar 56a and the two adjacent longitudinal bars until it passes downwardly over first bend 51 and second bend 57, thereby urging the hook 65 into the third hole 66c in the coupling band or ring 42. Once the locking mechanism 60a is in an engaged position P2, the locking mechanism 60a prevents the first locking longitudinal bar 56a from being urged radially outwardly and locks the first filter cage segment 40a to the coupling band or ring 42. Once the first filter cage segment 40a is removably coupled to the coupling band or ring 42, the first filter cage segment 40a and the second filter cage segment 40b are able to swing relative to each other in transverse directions (i.e. the filter cage 38 can flex with two degrees of freedom). Successive filter cage segments can then be similarly connected.

While the invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the foregoing description.

What is claimed is:

1. A filter support cage for a baghouse filter, the filter support cage comprising:
 a first filter cage segment, comprising an elongated body portion having an open top end and an open bottom end;
 a second filter cage segment, comprising an elongated body portion having an open top end and an open bottom end; and
 a coupling member positioned between and connecting the bottom end of the first filter cage segment and the top end of the second filter cage segment;
 wherein each of the first filter cage segment and the second filter cage segment comprises a plurality of longitudinal bars, with ends of at least one of the longitudinal bars connected to support members, and
 wherein two of the longitudinal bars on each filter cage segment include hooks that are hooked to the coupling member.

2. The filter support cage of claim 1, further comprising a first locking mechanism slidably located on the first filter cage segment and a second locking mechanism slidably located on the second filter cage segment, each of the locking mechanisms comprising a sliding bar that urges the hook on each of the first and second filter cage segments into the coupling member.

3. The filter support cage of claim 1 wherein a first of the two longitudinal bars on each filter cage hooked to the coupling member is flexibly attached to the filter cage and is hooked to the coupling member through positioning in a hole in the coupling member and locked therein.

4. The filter support cage of claim 3, wherein the first of the two longitudinal bars on each filter cage is locked to the coupling member by sliding a plate through which the first of the two longitudinal bars and through which two adjacently-positioned longitudinal bars passes over bends formed in each of the longitudinal bars.

5. The filter support case of claim 3, wherein a second of the two longitudinal bars on each filter case is rigidly attached to the filter cage and is hooked through a hole in the coupling member.

6. A filter case segment for a filter case in a baghouse, the filter cage segment comprising:
    an elongated body portion having an open top end, and an open bottom end,
    a first support member defined by a connector positioned at the top end,
    a second support member defined by a connector positioned at the bottom end,
    a plurality of longitudinal bars forming said elongated body portion extending between and connecting the first support member and the second support member,
    a locking longitudinal bar forming said elongated body portion and flexibly connected to one of the first support member and the second support member, and
    a retaining longitudinal bar forming said elongated body portion and rigidly connected to the first support member and the second support member and positioned substantially diametrically opposite the locking longitudinal bar; and
    a coupling member flexibly coupled to one of the top end and the bottom end of the elongated body portion via the locking longitudinal bar and the retaining longitudinal bar.

7. The filter cage section of claim 6, further comprising a locking mechanism slidably arranged on the locking longitudinal bar and two longitudinal bars positioned adjacent to the locking longitudinal bar.

8. The filter cage segment of claim 7, wherein the locking mechanism comprises a plate slidable over bends on the locking longitudinal bar and the two longitudinal bars positioned adjacent to the locking longitudinal bar to urge the locking longitudinal bar into a hole in the coupling member.

9. The filter cage segment of claim 6, wherein the locking longitudinal bar and the retaining longitudinal bar include hooked end portions that are received into holes in the coupling member.

10. The filter cage segment of claim 9, further comprising a third support member positioned between the first support member and the second support member.

11. A filter cage support for a filter in a baghouse, the filter cage support comprising:
    an elongated body portion, an open top end, and an open bottom end,
    a first support member defined by a connector positioned at the top end,
    a second support member defined by a connector positioned at the bottom end, the connector having a gap defined therein,
    a third support member defined by a connector positioned between the first support member and the second support member,
    a plurality of longitudinal bars extending between and connecting the first support member, the second support member, and the third support member and forming said elongated body portion,
    a locking longitudinal bar forming said elongated body having a first end flexibly connected to the first support member and having a second end positioned proximate the gap, the second end defining a first hook,
    a sliding locking plate positioned on the locking longitudinal bar and on at least one of the longitudinal bars adjacent to the locking longitudinal bar, and
    a retaining longitudinal bar forming said elongated body extending between and rigidly connected to the first support member and the second support member and positioned substantially diametrically opposite the locking longitudinal bar, the retaining longitudinal bar defining a second hook proximate the bottom end of the elongated body portion; and
    a coupling member having a plurality of openings therein, the coupling member being coupled to the bottom end via the first hook of the locking longitudinal bar and the second hook of the retaining longitudinal bar received in respective openings in the coupling member.

12. The filter cage support of claim 11, wherein the locking longitudinal bar and the at least one longitudinal bar adjacent to the locking longitudinal bar define bends proximate the bottom end of the elongated body portion.

13. The filter cage support of claim 12, wherein the sliding locking plate is slidable over bends in the direction of the bottom end to urge the first hook into one of the openings in the coupling member.

14. The filter cage support of claim 11, wherein the openings in the coupling member comprise holes.

* * * * *